United States Patent [19]
Hannah

[11] Patent Number: 5,157,506
[45] Date of Patent: Oct. 20, 1992

[54] STANDARDIZED COLOR CALIBRATION OF ELECTRONIC IMAGERY

[75] Inventor: Eric C. Hannah, Mill Valley, Calif.

[73] Assignee: Savitar, Inc., San Francisco, Calif.

[21] Appl. No.: 628,346

[22] Filed: Dec. 14, 1990

Related U.S. Application Data

[63] Continuation-in-part of Ser. No. 574,899, Aug. 29, 1990.

[51] Int. Cl.⁵ .................. H04N 1/23; H04N 1/46; G01J 3/40; G01J 3/51; G01N 21/25
[52] U.S. Cl. .................. 358/298; 358/455; 358/76; 358/80; 356/404; 356/419; 356/422; 356/425; 364/526
[58] Field of Search .................. 358/27, 28, 29, 10, 358/17, 80, 76, 75, 298, 455; 355/35, 38; 354/295, 430, 106; 356/404, 419, 300, 421, 422, 425; 364/526, 571.01

[56] References Cited

U.S. PATENT DOCUMENTS

| | | |
|---|---|---|
| 3,260,180 | 7/1966 | Teeple .................. 354/295 |
| 3,363,525 | 1/1968 | Teeple .................. 354/295 |
| 3,446,125 | 5/1969 | Uhlmann .................. 354/295 |
| 4,037,249 | 7/1977 | Pugsley .................. 358/80 |
| 4,054,389 | 10/1977 | Owen . |
| 4,136,360 | 1/1979 | Hoffichter et al. . |
| 4,211,558 | 7/1980 | Oguchi .................. 356/425 |
| 4,212,072 | 7/1980 | Huelsman et al. . |
| 4,307,962 | 12/1981 | Jung .................. 358/80 |
| 4,365,882 | 12/1982 | Disbrow .................. 354/106 |
| 4,500,919 | 2/1985 | Schreiber . |
| 4,527,189 | 7/1985 | Ooi et al. .................. 358/29 |
| 4,583,186 | 4/1986 | Davis .................. 364/526 |
| 4,647,961 | 3/1987 | Kammoto et al. .................. 358/75 |
| 4,658,286 | 4/1987 | Schwartz et al. . |
| 4,670,780 | 6/1987 | McManus .................. 358/80 |
| 4,698,669 | 10/1987 | Sekizawa .................. 358/80 |
| 4,751,535 | 6/1988 | Myers .................. 358/80 |
| 4,875,032 | 10/1989 | McManus .................. 358/80 |
| 4,917,492 | 4/1990 | Koishi .................. 356/300 |

FOREIGN PATENT DOCUMENTS

8905465 6/1989 PCT Int'l Appl. .

*Primary Examiner*—Benjamin R. Fuller
*Assistant Examiner*—Scott A. Rogers
*Attorney, Agent, or Firm*—Heller, Ehrman, White & McAuliffe

[57] ABSTRACT

A system produces a standardized image of an object from an intermediate object recorded on film. An image of a spectrum of the light source illuminating the object is recorded on the film together with the image of the object. The image of the spectrum on the film is recorded by a film scanner and compared with the spectrum of a standatd illuminant. Color correction data is generated from the comparison. The color correction data may be used to control a photographic printer to produce a color corrected print. The color correction data may also be used to correct a digital image of the object produced by scanning the image of the object on film.

33 Claims, 9 Drawing Sheets

STANDARDIZED COLOR CALIBRATION OF ELECTRONIC IMAGERY

This application is a continuation-in-part of application Ser. No. 07/574,899 filed Aug. 29, 1990.

The present invention is directed generally to color calibration, and more particularly to calibrating electronically-recorded color images against a standard color specification.

A central problem in color communication is that of calibrating equipment in terms of an accepted standard of color measurement. Color communication apparatus, such as video cameras, monitors and printers, have excellent reproducibility within certain apparatus types. Few standards, however, exist for exchanging color information between apparatus types.

The apparent color of an object is determined by three principal factors. These are: the optical properties of the material from which the object is made; the type of light source which illuminates the object; and the way in which the viewer, or a color recording device or observing instrument, perceives different colors.

The optical properties of a material or object include the extent to which it reflects or absorbs the different wavelengths (or colors) of the visible spectrum. For most materials, the optical properties are absolute. That is, an object will have the same optical properties indoors or outdoors.

Under normal lighting conditions, the human eye perceives color because the retina of the eye has homogeneously distributed points which are primarily sensitive to different colors, i.e., blue, green and red. The sensitivity to green is greatest, and the sensitivity to blue is least.

Electronic image recorders mimic the function of the eye by recording an object or image using red, green and blue detectors. The detectors may be arranged in a matrix dividing the image into a number of picture elements, pels or pixels. The signals from the detectors may be recombined and observed as a colored image, for example, on a TV screen or monitor. The signals from the different color detectors may be adjusted electronically so that, in effect, the sensitivity of the red, green, and blue detectors can be varied. Furthermore, the sensitivities of the red, green, and blue detectors may be varied relative to each other to electronically "balance" a perceived color of an object or image.

Figure 1:
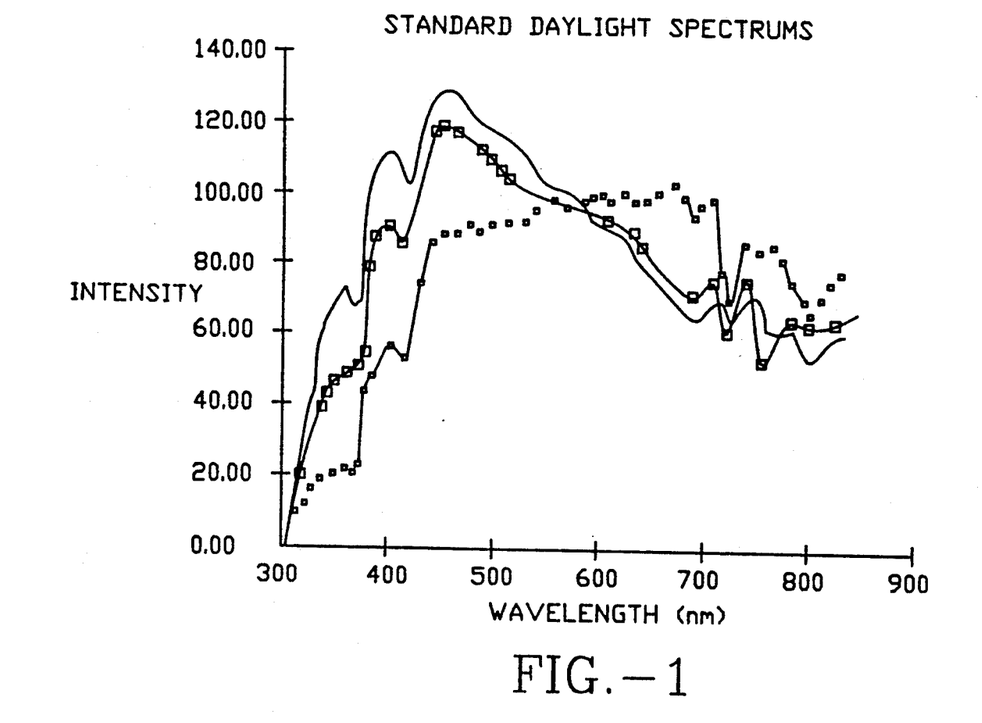
FIG. 1 is a graphical representation of light intensity versus wavelength illustrating standard daylight spectrums.

The illumination or light source presents a severe problem in color recording and communication. The problem is due to the different spectral outputs or intensity as a function of wavelength of the different light sources. Sunlight, i.e. daylight, has maximum intensity for green light. The energy distribution, however, differs according to the time of day and weather conditions. FIG. 1 shows standard daylight spectra for different daylight conditions. Specifically, the values are three of the CIE (Commission International de l'Eclairage) standard values representing daylight in different climatic and temporal conditions. Curve A is standard $D_{75}$, curve B is standard $D_{65}$, and curve C is standard $D_{55}$. The standard is now generally accepted as being a reasonable approximation to "average" daylight.

Figure 2:
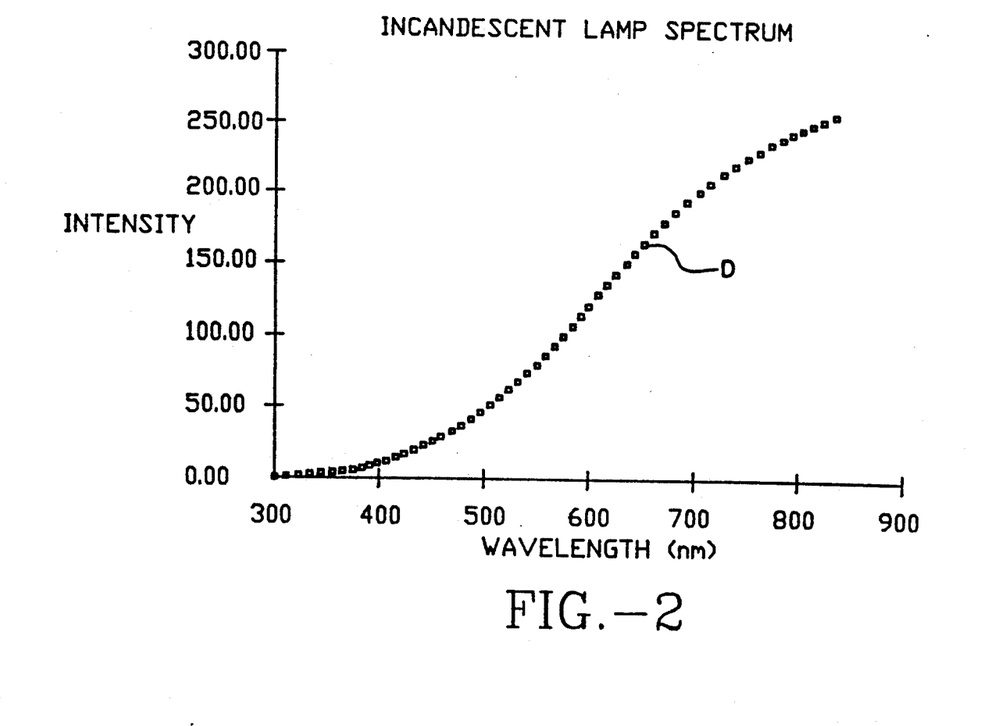
FIG. 2 is a graphical representation of light intensity versus wavelength for an incandescent light source.

Incandescent light sources have the least light intensity at the short wavelength (blue) end of the visible spectrum and the highest light intensity at the long wavelength (red) end of the visible spectrum. Curve D of FIG. 2 shows the output spectrum for an incandescent lamp. The output spectrum changes with the temperature of the lamp; i.e., it may change with the power at which the lamp is operated. Blue and green light intensities increase with respect to red as the temperature increases. If an incandescent source could reach a temperature of 6,500 degrees Kelvin, the output spectrum would resemble a "smoothed" version of the CIE standard $D_{65}$ (curve B) of FIG. 1. This is the origin of the term "color temperature", which is common in color photographic science.

Although the optical properties of a material or object are generally constant, the spectral content of light reflected from an object or material will vary according to the illumination source. A fixed set of detectors then will record the light reflected from an object in different colors depending on the light source. Post processing of the detector signals may be used to minimize these perceived color differences.

The human brain does an excellent job of such post processing. For example, the brain allows an object which appears white in daylight to also be perceived as white when illuminated by an incandescent light source. Incandescent light is yellow compared with daylight. Thus, an object which is white in daylight should appear yellow in incandescent light. However, it is perceived as white because it has the color closest to white in the context of it's surroundings. This deception or processing by the brain is called contextual color perception. It is nature's way of making colors appear constant under various conditions. Needless to say, a person's ability to remember how things appeared when viewed in a different set of lighting conditions is a very complex process, including the ability of the eye to scan a scene so that an observed object is "processed" in detail. This is particularly important in conditions where a scene includes a wide range of highlights and shadows.

In a video camera, the post processing of detector signals is done by electronic circuitry. The video equivalent of human contextual perception is imitated by establishing a "white-balance" between the red, green, and blue detectors. The white-balance process may involve simply directing the camera at a white surface, a neutral colored surface, or a diffusing screen which integrates all light from a scene. The white-balance process then involves electronically equalizing the signals from the red, green and blue detectors. Thereafter, colors are interpreted by the differences in the red, green and blue signal levels from the levels that represent white or neutral. A new white-balance must be established if lighting conditions change.

White-balance processes used heretofore provide a white balance from a single object or from a scene as a whole. The white-balance setting so obtained is used to represent all objects in the scene independent of the luminous intensity of the particular object under observation. The red, green and blue detectors, however, may have a different response as a function of illumination level or luminance. The response as a function of illumination level is known as the gamma curve. Thus, a different white-balance factor may be needed for different illumination levels. A particular scene may include highlights and shadows which may differ in luminous intensity by a factor of about 200 to 1. As such, many individual features of a recorded scene may not be properly white balanced, and thus the colors may be less faithfully reproduced.

The international standard for color specification is the system devised by the 1931 CIE (Commission International de l'Eclairage). It represents color as a series of x, y, and z coordinates on a chromaticity diagram. The coordinates are determined from normalized-spectrophotometric measurements of a colored surface. The values of reflection versus wavelength are first mathematically weighted by values of relative light intensity versus wavelength for a standard illuminant. The illuminant-weighted reflection versus wavelength measurements are then further weighted by the response curves simulating the response of the red, green, and blue sensitive portions of the human eye. This provides three different sets of spectral data. The eye response curves have been standardized by years of experiments and tests. They provide a representation of how an average human (the CIE "standard observer") perceives color. Each set of spectral data is integrated to determine the total energy in each color. The total energies are known as the X, Y, and Z tristimulus values. The total energy in all colors is determined by adding the energy in each color. The data may then be represented as the x, y, and z coordinates on a chromaticity diagram, which represent the fraction of each color in the total. The color specification thus contains information on the absolute optical properties of an object. The specification also includes information on the illumination conditions.

The important difference between the CIE color specification method and the white-balance system used in video recording is the inclusion in the CIE specification of spectral data for the object and light-source, and the simulated response of the red, green and blue portions of the eye of the average observer. Any color measuring instrument or colorimeter has spectral data for the various standard illuminants programmed into a memory as well as the standard red, green and blue responses for the standard observer. The color measurement involves simply taking a reflection versus wavelength spectrum of the object. The electronics of the colorimeter then perform the necessary transformations of the spectral data into color coordinates.

Reflection and transmission spectra are measured by instruments called spectrophotometers. Spectrophotometers may use systems of prisms and diffraction gratings to generate a linear spectrum of an internal light source. Various portions of the spectrum are selected by scanning the spectrum across a slit to allow the passage of only a narrow region of color. The colored light is reflected from, or transmitted through, the object under observation, and its intensity is then measured. The process is slow, requiring a minute or more to scan the visible spectrum. The instruments are bulky because of the requirement for scan drive motors and slit drive motors. Such instruments are now often used for high resolution analysis in chemical and biological research.

For applications where high resolution is not important, a spectrophotometer may use an array of charge-coupled detectors (CCD), a CCD array, as the spectral scanner. Light from the object under observation is spread into a spectrum which is imaged onto the array. Each of the red, green and blue detectors in the array records a different spectral color. The array can be scanned electronically in milliseconds to provide a complete spectrum. Such a spectrophotometer may be the key element of a color measurement device which may provide virtually instantaneous measurements in standard color coordinates.

Color-recording apparatus operate on an internal standard related to a particular set of color detectors. As detector technology and control electronics have improved, so have the reproducibility of the color signals from a particular apparatus. The recorded signals, however, are not calibrated in any way. Devices which interpret the signals and present them for viewing have no way of knowing under which lighting conditions the signals were generated or the optical properties of the objects portrayed. Therefore, color communication systems have no capability to record a colored image and interpret it so that it appears the way it would appear to the majority of human observers. The output of a color-image, recording device has no information concerning the illumination conditions of the object or the absolute optical properties of objects in the recorded scene. Color communication apparatus can not deal with point-to-point color distortion caused by wide variations of lighting within a scene. In the absence of a standardized calibrated system, colors may never be recorded and faithfully reproduced by electronic equipment. Also, it may never be possible to reproduce the full range of subtle colors and shades that the unaided eye can see.

The problem of exact color reproduction is not restricted to electronic imaging. Photographic film is also not a completely accurate medium for recording color information from a scene. The colors of a scene reproduced on color reversal or color negative film are influenced by many factors other than the absolute color attributes of the objects in the scene. The lighting conditions influence the color rendition in much the same way as for video images. The color photographic image is also influenced by the origin (the manufacturer) of the film; the film speed rating; the development time; and the development chemical conditions, including the temperature and the freshness of the developer solution.

A developed color negative film ready for printing or a developed color reversal film (slides or transparencies) does not include any information on the color influencing factors. A color printer or a video slide scanner may only attempt to reproduce as accurately as possible what is present on the film.

Commercial photographic laboratories may use computer controlled color print processors to produce prints from negatives. An essential part of the printing process is the selection of the exposure values for the color filters used to reproduce the color image. The automatic selection system is similar to the white balance system in video color processing. The range of color values in negative is integrated and recorded electronically, and primary color filter factors are chosen, by the print processor's internal computer, which will interpret the integrated color values as neutral. The selected color filter factors are the used to print the film. At best an exact reproduction of the image on the film is obtained. The image unfortunately will be complete with the color aberrations introduced by the lighting, film and processing. When films are printed manually, the selection of filter factors is left to the person doing the printing. The printing person's judgement thus influences the print. While the resulting print may be aesthetically more pleasing than an automatically produced print, what is printed may still not represent a true image of the scene.

Electronic graphic printing may be used to provide instant enlargements from slides and color negatives. However a slide or a film scanned electronically to produce an electronically generated image for video or for color graphic printing will also still be complete with the color aberrations introduced by the lighting, film and processing. This is true even if the image on the slide or film could be reproduced exactly. In practice additional color aberrations are added by the inaccuracy of the electronic scanning process discussed above.

Accordingly, it is an object of the present invention to provide an electronic color image recording system which can calibrate the colors of an object or image to correspond to a standard color specification system.

It is a another object of the present invention to provide an electronic color image recording system which can calibrate colors of an object so that they are accurate at different levels of illumination.

It is yet another object of the present invention to provide a color image recording system which will represent an image as it would be perceived by a majority of human observers under similar lighting conditions.

It is a further object of the present invention to provide a photographic color printing system which will represent an image as it would be perceived by a majority of human observers under similar lighting conditions.

It is still another object of the present invention to provide a slide and film scanning system which will represent an image as it would be perceived by a majority of human observers under similar lighting conditions.

SUMMARY OF THE INVENTION

The present invention comprises a system for calibrating an electronically-recorded color image of an object. The system may comprise a means for forming an image of the object on a plurality of red (r), green (g) and blue (b) detectors. The detectors produce r, g, and b signals characterizing the image as a plurality of r, g and b pixels. The system further includes means for recording the r, g, and b signals, and means for generating color calibration data including a spectrum of a light source which illuminates the object.

The system also includes means for transforming the recorded r, g, and b signals into equivalent CIE X, Y, and Z values for the object, as illuminated by the light source, using the color calibration data.

The system may use a spectral plate and a gray bar mounted in a holder. The spectral plate comprises a linear variable bandpass filter for resolving the output of the light source into a spectrum. The gray bar is a linear variable neutral density filter for resolving the output of the light source into a gray scale. An auxiliary lens is provided to focus a camera, for example, on the filters mounted in the holder. The combination of the lens and filter may be called a color calibration unit.

A method in accordance with the present invention includes forming an image of an object on a plurality of r, g, and b detectors, and then producing r, g, and b signals characterizing the image as a plurality of r, g, and b pixels. The r, g, and b signals are recorded, and color calibration data, including a spectrum of a light source illuminating the object, is generated. The recorded r, g, and b signals are then transformed into equivalent CIE X, Y, and Z values for the object as illuminated by the light source.

The output data contains all the information needed by an interpreting device, such as a monitor or a printer, to represent the image in any of the standard color systems derived from the basic CIE system. The data may be used to control a color photographic printer or a color electronic graphics printer. Any images recorded electronically or photographically can thus be represented as it would be seen by a human observer under the lighting conditions at which the image was originally recorded.

The invention may be used to correct color aberrations in a photographic image of an object. Photographic recording apparatus is used to form an image of the object on film. The photographic recording apparatus includes means for recording on the film an image of a spectrum of a light source illuminating the object. The invention may be used to scan the film and record an electronic image of the photographic image of the object and an electronic image of the photographic image of the spectrum of the light source illuminating the object. The electronic image of the photographic image of the spectrum is compared with the spectrum of a standard illuminate. A color correction matrix is generated from the comparison. The color correction matrix may be used to modify exposure parameters in a color photographic printer. The color correction matrix may also be used to correct the electronic image of the photographic image of the object. The corrected electronic image of the object may be displayed on a video display unit or used by a color graphics printer to generate a fixed graphic image of the object.

DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below serve to explain the principles of the invention.

DETAILED DESCRIPTION OF THE PRESENT INVENTION

Figure 3:
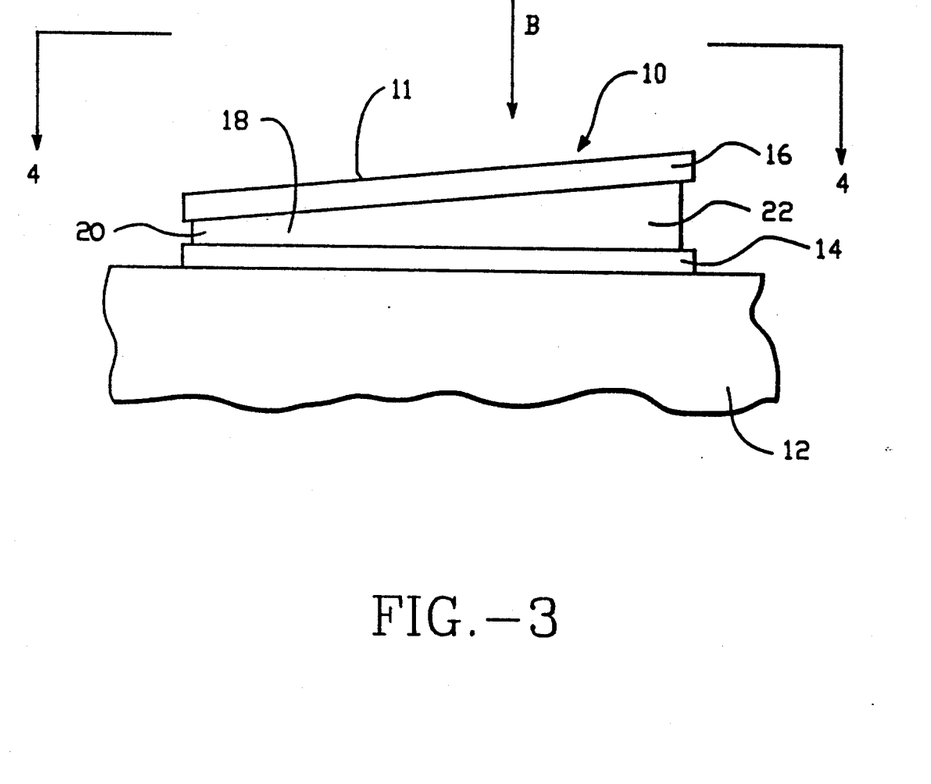
FIG. 3 schematically illustrates the linear variable bandpass filter and spectral plate of the present invention.
Figure 4:
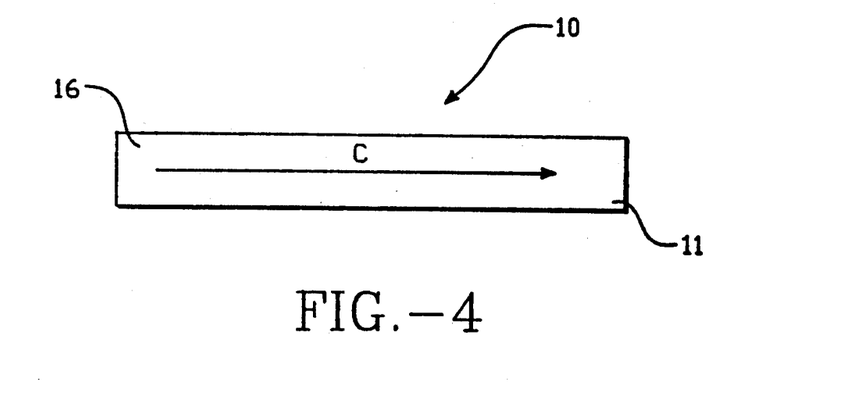
FIG. 4 is a plan view along line 4-4 of FIG. 3.

Now referring to FIGS. 3 and 4, the present invention is shown as including a spectral plate represented generally by reference numeral 10. The spectral plate 10 comprises a linear variable bandpass filter 11 and a transparent substrate 12. For relatively low resolution spectroscopy, $\Delta\lambda \cong 10$ nanometers (nm), half power bandpass, the linear variable filter 11 supplies a convenient alternative to the prisms and gratings of a conventional spectrophotometer.

The filter 11 includes light reflecting layers 14 and 16, and a transparent spacer layer 18. The spacer layer 18 increases linearly in thickness (in one direction only) from an end 20 to an end 22 of layer 18. The spacer layer 18 forms an optical resonant cavity between reflectors 14 and 16 along the direction of Arrow C of FIG. 4. The resonant frequency or the passband wavelength of filter 11 is determined by the separation of reflectors 14 and 16. The passband width, or spectral resolution, of filter 11 is determined by the reflectivity of reflectors 14 and 16. The thickness of spacer layer 18 is such that the short wavelength end of the passband wavelength is at end 20 and the long wavelength end of the passband wavelength is at end 22. The extremes of the passband wavelength may be between about 380 and 780 nanometers (nm). When white light is transmitted through spectral plate 10 in the direction shown by the arrow B, it will appear as a linearly graded spectrum, the wavelength of the spectrum increasing in the direction of arrow C.

The reflector layers 14 and 16 may be metal layers, for example a semitransparent layer of silver. The reflector layers 14 and 16 may also be formed from a number of sub-layers comprising alternating layers of transparent materials having high and low refractive indices. Such reflectors are known as multilayer, dielectric reflectors. Multilayer, dielectric reflectors are wavelength selective. The layers forming the reflectors may be graded in thickness such that the maximum reflection always occurs at the passband wavelength at any position on plate 10.

Figures 5, 5A:
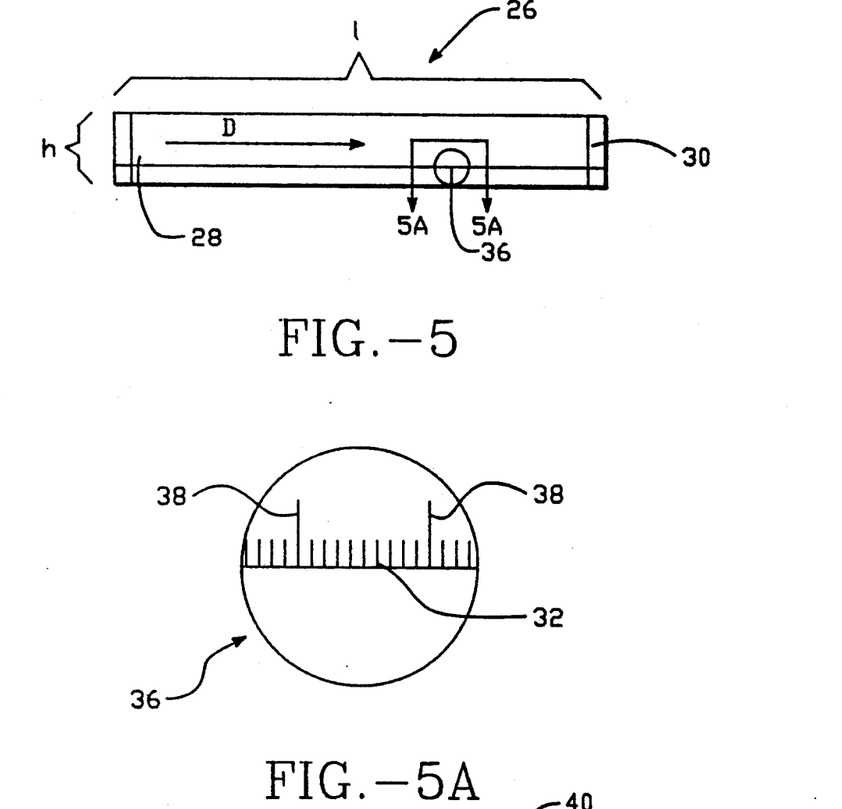
FIG. 5 schematically illustrates the calibrated gray scale or gray bar of the present invention.
FIG. 5A is an enlarged view of a portion of the gray bar of FIG. 5.

As shown in FIG. 5, the present invention may also include a linear variable neutral density filter or gray bar 26. The gray bar 26 is a window which transmits all wavelengths of light equally but varies in optical density from opaque to transparent along its length. This allows white balance, i.e. the gray or neutral balance, to be set for a wide range of luminosities. The gray bar 26 may be disposed in the same plane as spectral plate 10. The gray bar 26 is graded in density in a direction along arrow D. The end 28 of the gray bar is opaque and the end 30 is transparent. The gray bar may be supplied with fiducial marks 32 as shown in FIG. 5A, which is an enlarged view of area 36 of the gray bar. The fiducial marks 32 permit accurate calibration of the grey scale. The height "h" of the gray bar may be about 5 millimeters (mm) and the length "l" about 25 mm. The fiducial marks 32 are preferably at 0.1 mm intervals and are about 0.3 mm high. Larger marks 38 about 1 mm high may occur at 1.0 mm intervals, i.e. at every ten marks. Similar fiducial marks may be provided for the linear variable filter.

Figure 6:
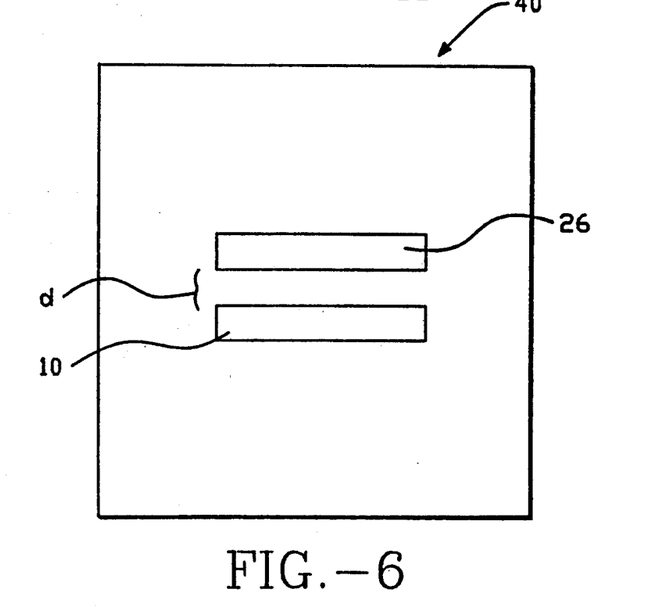
FIG. 6 schematically illustrates a holder for the spectral plate and gray bar of the present invention.

The spectral plate 10 and gray bar 26 may be mounted in a filter holder 40 as shown in FIG. 6. The holder 40 may be square in shape and have a dimension about 49 mm on each side to correspond to the size and shape of a 35 mm slide holder. The gray bar 26 and the spectral plate 10 may each be about 5 mm high by about 25 mm long. They may be separated by a distance "d" equal to about 4 mm, and they may be located in the center of holder 40.

Figure 7:
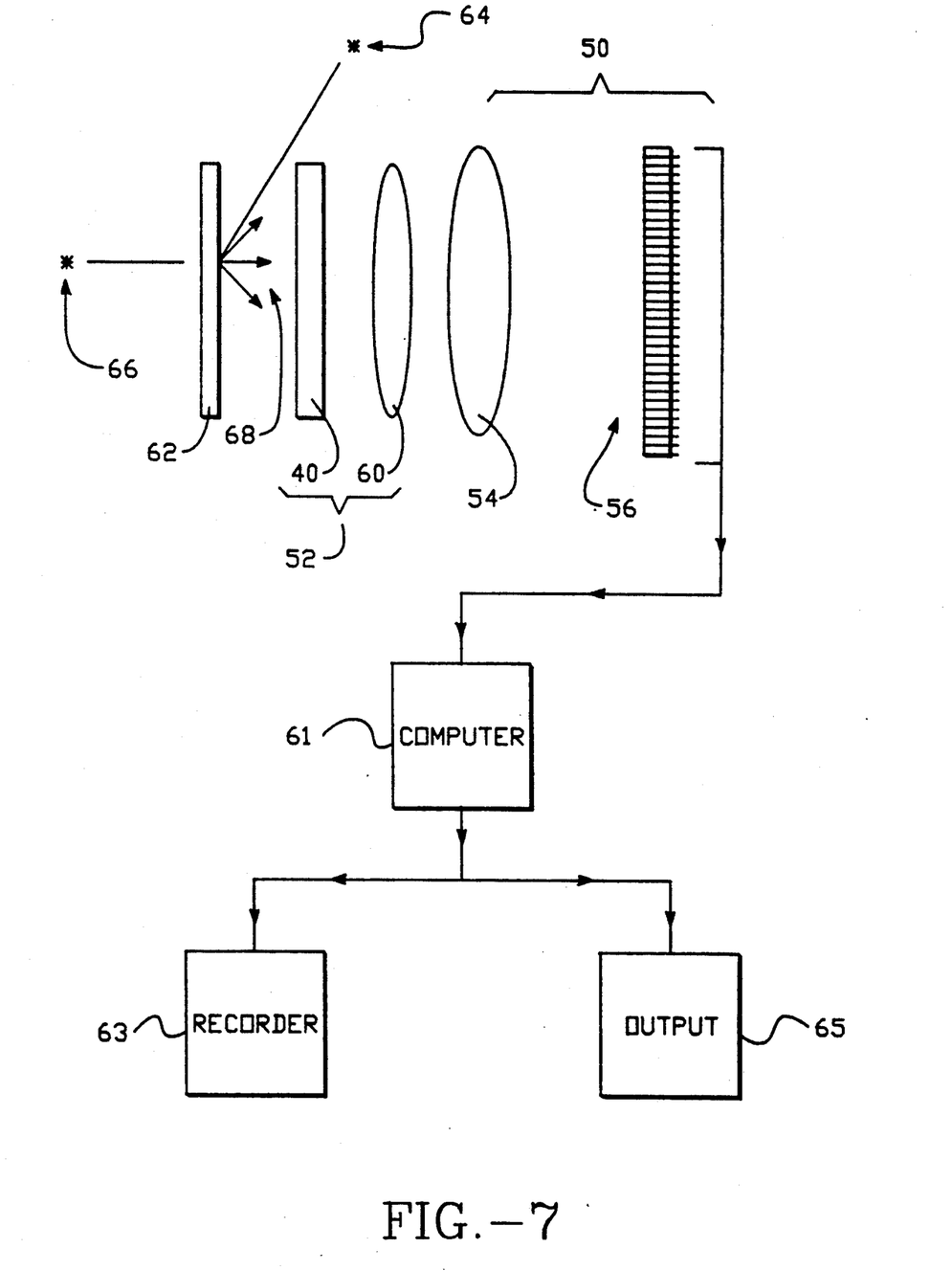
FIG. 7 schematically illustrates the arrangement of the filter holder and a color recording device in accordance with the present invention.

FIG. 7 illustrates how the spectral plate 10 and gray bar 26 may be used to provide calibration data for an image recorded by an electronically-operated video (moving or still) camera. As is well known, such a camera 50 may include a lens 54 and a charged-coupled device (CCD) array 56. The lens 54 is shown as a single element for clarity. As is known, lens 54 may actually comprise a number of optical lens elements or lenses suitably disposed relative to each other.

The filter holder 40 and a lens 60 represent a calibration unit 52 in accordance with the present invention. As discussed, filter holder 40 includes spectral plate 10 and gray bar 26. The lens 60 is an auxiliary lens which enables the camera to focus on spectral plate 10 and gray bar 26 in holder 40. The holder 40 and lens 60 may be mounted in a lens cap (not shown) which is removably secured to the front of the camera lens. After the color calibration operation, the lens cap can be removed to permit proper operation of the camera.

The present invention has been described above in terms of a calibration system that may be adapted to existing color input devices. As such, it has been described as including a spectral plate and a gray bar external to the color input device. As described, the system is used for periodic calibrations wherein it is mounted on the color input device, e.g. a camera, for calibration and then removed for recording an object or a scene.

It will be apparent to those skilled in the art that the spectral plate and gray bar may be designed to be located within the color recording device as integral components of the device. The integral spectral plate and gray bar may be used between recordings for color input device calibration as described above. The integral spectral plate and gray bar may also be used continuously, for example, in video cameras. Continuously operating calibration systems may require a focal plane detector array designed to record the calibration data and the scene or object data simultaneously. Alternatively, a separate optical channel may be used to record the calibration data on a separate detector array.

During the color calibration operation, the camera is pointed toward a white target 62 located a distance of about one centimeter (cm) in front of filter holder 40. The white target 62 may be opaque in which case it would be illuminated by a light source 64 in the direction shown by arrow E. The white target may also be a diffusion screen or a translucent surface in which case it is illuminated by a light source 66 in the direction shown by arrow F.

Light 68, whether from light source 64 or 66, is incident on spectral plate 10 and gray bar 26 in holder 40. The combination of auxiliary lens 60 and camera lens 54 forms an image of spectral plate 10 and gray bar 26 on array 56. The spectral content of the light source 64 or 66 is recorded by the red (r), green (g), and blue (b) detectors of CCD array 56 from the image of spectral plate 10. The response of the r, g, and b detectors to different luminance levels may be recorded from the image of gray bar 26.

Signals from CCD array 56 are passed to a suitable-programmed computer or microprocessor 61 for processing. The signals may include the r, g, and b signals representing the image pixels of the object or scene. The signals may also include the r, g, and b signals representing the image pixels of spectral plate 10 and gray bar 26.

The computer 61 stores in its memory the CIE X, Y, and Z matching curves, and records and stores the r, g, and b signals representing the image pixels of the object. The computer also records the r, g, and b signals representing the image of the spectral plate and stores those signals as the r, g and b spectra ($r(\lambda)$, $g(\lambda)$ and $b(\lambda)$) of the light-source illuminating the object. The computer also records the r, g, and b signals representing the image of the gray bar and stores those signals as the r, g, and b responses as a function of luminance.

Further, the computer computes and stores a mathematical map and look up tables (LUTS) to convert the r, g, and b responses as a function of luminance to linear r, g, and b responses as a function of luminance. That is, the computer computes and stores linearizing LUTS.

The r, g, and b spectra are linearized using the linearizing LUTS and then stored in the computer. As also discussed below, the computer makes use of the CIE matching curve data and the linearized r, g, and b spectra to compute a transform matrix for converting the r, g, and b signals into CIE X, Y, and Z values. This transform matrix is stored in the computer. The transform matrix is used to convert the r, g, and b signals representing the image pixels of the object into CIE X, Y, and Z values. The transform matrix is also used to convert the r, g, and b signals representing the linear r, g, and b responses as a function of luminance into CIE X, Y, and Z values.

As such, the recorded r, g, and b signals are converted into equivalent CIE X, Y, and Z values for the object, as illuminated by a light source, using color calibration data generated by computer 61. The standardized color image may be stored for future use by a recorder 63 or may be displayed by an output device 65 such as a monitor.

Figure 8:
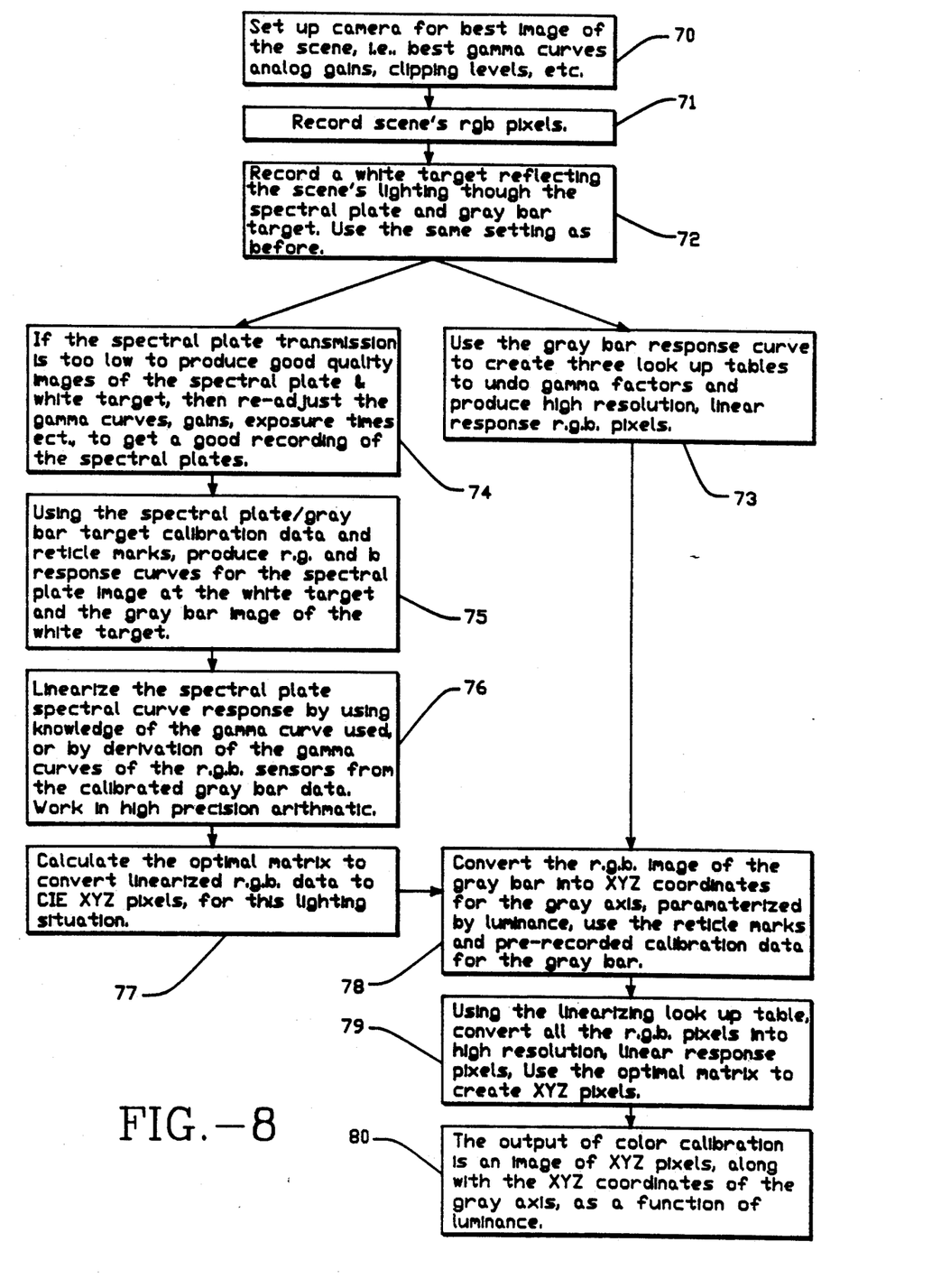
FIG. 8 is a flow chart describing the color image calibration procedure.

A method of producing a standardized calibrated color image of an object or material is now discussed with respect to the flow diagram of FIG. 8. As shown by box 70, camera 50 is set up to record the best image of an object or scene. Adjustments may include setting analog gains, clipping levels and adjusting the gamma curves to obtain the best image of the scene This adjustment may be independent of the need to calibrate colors. The gamma curves are non-linear because they must respond continuously to scenes having a large range of luminance. Very low and high light levels have few output levels, and medium light levels have a large range of output levels. As such, the gamma curves often have an "S" shape. In most input devices, such as video cameras, the gamma curves may be preset or adjusted automatically to handle the particular variations of luminance in a scene.

Once the camera has been set up, the scene is recorded as a series of r, g, and b pixels (box 71). The calibration unit 52, including filter holder 40 and auxiliary lens 60, is then mounted on the camera. The camera and the calibration unit are then directed toward a white target 62 to form on CCD array 56 an image of the spectrum produced by filter 11 and gray bar 26 (see box 72).

The gray bar image is used to record the r, g, and b response curves, i.e. the gamma curves. The response curves are then used to generate look up tables to convert the "S" shaped gamma curve into linear response curves, i.e. linear gamma curves. Thus, the recorded r, g, and b pixels of the scene may be converted into high resolution, linear response pixels (box 73).

If the transmission of spectral plate 10 is too low to produce a good quality image, the gamma curves, analog gains and exposure times may be adjusted to obtain a good recording of the image of the spectral plate (See box 74). A further recording of the gray bar image may be necessary if the settings of box 70 are altered.

Using the spectral plate/gray bar target calibration data and the fiducial marks, r, g, and b response curves are produced for the spectral plate image of the white target and the gray bar image of the white target. The spectral plate image, i.e. the spectrum of the light-source, is recorded for the r, g, and b detectors. If the camera settings were altered to obtain a good recording of the spectral plate image, another set of r, g, b response curves for gray bar 26 are generated (see box 75). These curves represent the responses for the adjusted camera settings of box 74.

Next, the r, g, and b spectra of the spectral plate image are linearized. The linearization may be effected using data on the gamma curves derived from a recording of a gray bar image (see box 75), or from actual knowledge of the gamma curve settings used. The calculations are preferably performed in high precision arithmetic (see box 76).

A transform matrix M for converting the recorded r, g, and b signals of the scene into CIE X, Y, Z values for the lighting situation is calculated (see box 77). The matrix M may be a 3×3 matrix defined as:

$$M = \begin{pmatrix} m_{11} & m_{12} & m_{13} \\ m_{21} & m_{22} & m_{23} \\ m_{31} & m_{32} & m_{33} \end{pmatrix} \quad (1)$$

where $m_{11} \ldots m_{33}$ are the matrix elements.

The r, g, and b signals are converted according to the equation:

$$\begin{pmatrix} X \\ Y \\ Z \end{pmatrix} = M \begin{pmatrix} r \\ g \\ b \end{pmatrix} \quad (2)$$

The matrix is required to reduce the mean square error between the r, g, and b spectra ($r(\lambda)$, $g(\lambda)$, and $b(\lambda)$ where $\lambda$ is the wavelength), and the X, Y, and Z spectra ($X(\lambda)$, $Y(\lambda)$, and $Z(\lambda)$). The matrix will depend on the camera's r, g, and b detector properties, and the spectrum of the light-source illuminating the scene. The r, g, and b spectra are recorded (see boxes 75, 76), and the X, Y and Z spectra are the standard CIE matching curves. The following equation (3) must then be minimized:

$$I = \int_{380 \text{ nm}}^{780 \text{ nm}} \left[ \begin{pmatrix} X(\lambda) \\ Y(\lambda) \\ Z(\lambda) \end{pmatrix} - M \begin{pmatrix} r(\lambda) \\ g(\lambda) \\ b(\lambda) \end{pmatrix} \right]^2 d\lambda \quad (3)$$

$$\frac{\partial I}{\partial m_{ij}} = 0 \quad (4)$$

where $\frac{\partial I}{\partial m_{ij}}$ is the partial derivative of $I$ with respect to any matrix element $m_{ij}$.

Equations (3) and (4) may then be solved to give the optimum transform matrix M.

Next, the r, g and b images of the gray bar (box 73) are converted, using the transform matrix M, into X, Y and Z values. The reticle or fiducial marks and prerecorded calibration data for the gray bar are used to produce X, Y, and Z coordinates of the gray axis (gray scale) as a function of luminance (see box 78).

The linearizing look up tables (see box 73) can then be used to convert the scene r, g, and b pixels (recorded in box 71) into high resolution linear response r, g, and b pixels. The transform matrix M is then used to convert the r, g, and b pixels into X, Y, and Z pixels or values (see box 79).

The output of the color image calibration method thus has two parts (see box 80). The first part is an image in X,Y, and Z values, i.e., an image calibrated in the an internationally-accepted CIE system, which is based on the absolute optical properties of the various parts of the scene and the spectral content of the light source illuminating the scene. The second part is the X,Y, and Z values of the gray axis (gray scale) as a function of luminance. This allow an accurate white or neutral point in a particular color space to be determined for any level of luminance.

The output data of the camera or other such device may be recorded, or interpreted by an output device such as a monitor or a printer. The components of color and luminance allow the data to be interpreted into other color systems, such as the Hunter L, a, b system or the CIE U*, V*, W* system, which are derived from the CIE system.

It should be evident that the above process may be used to calibrate an image as it would be perceived by a human observer under lighting conditions different from the original lighting conditions. This may be done by providing details of the spectrum of the desired lighting conditions and then transforming the image pixels via a new matrix equation.

Another embodiment of the present invention is directed to calibrating photographic slides. Here, holder 40 can be a standard 35 mm photographic slide holder. In a slide scanner, white target 62 can be a diffusing screen for light source 66 illuminating the slide for scanning. Calibration would be performed with spectral plate 10 and gray bar 26 in holder 40 as described above. For slide scanning, holder 40 may be removed and replaced with the slide to be scanned mounted in its own holder. The slide to be scanned would thus occupy the same position as holder 40.

Yet another embodiment of the present invention is directed to calibrating a digital color printer using spectral plate 10. The printer once calibrated may interpret the output signals of an input device, such as a video camera, calibrated according to the method described above. The method is outlined in the flow diagram of FIG. 9.

Figure 9:
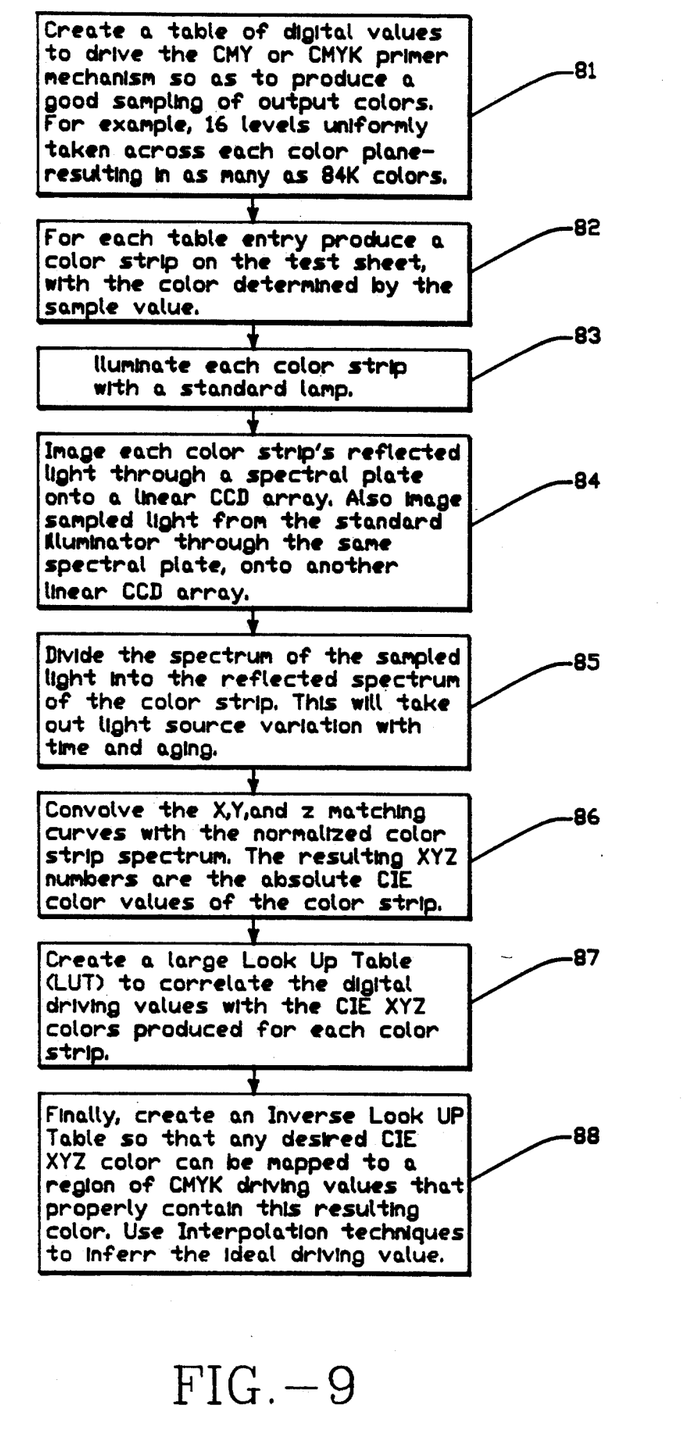
FIG. 9 is a flow chart describing the calibration of a color printer for receiving standardized calibrated color image data.

First, a table of digital values is created to drive the cyan-magenta-yellow (CMY) or cyan-magenta-yellow-black (CMYK) printer mechanism. This table preferably contains a sufficient range of values to produce a good sampling of output colors. For example, 16 equispaced intensity levels may be taken across each color plane resulting in about 64 thousand different colors (see box 81).

For each table entry, a color strip is produced on a test sheet. The color is determined by the digital values. About 64,000 color strips may be produced (see box 82). Each color strip is then illuminated (box 83) with a standard lamp such as a tungsten-halogen lamp.

The reflected light from each of the illuminated color strips is imaged sequentially through spectral plate 10 onto a linear CCD array. The color spectra of the illuminated color strips are recorded. Sample light from the standard lamp is also imaged through the same spectral plate onto another, or the same CCD at a different time, linear CCD array and the spectrum of the standard lamp is recorded (see box 84).

The spectrum of the standard lamp is divided (box 85) into the reflected spectrum of each illuminated color strip (box 85). The result is a normalized reflection spectrum of each color strip. The effects of the lamp spectrum, changes in the lamp spectrum, and the spectral response of the detectors are removed by this normalization procedure.

The normalized spectrum of each color strip from box 85 is convolved with the CIE X, Y, and Z matching curves.

The resulting values are the CIE X, Y and Z values for each color strip (see box 86).

A mathematical map is then created (box 87) correlating the CIE X, Y, and Z values of box 86 with the digital driving values of box 81. The large look up table (LUT) is created to correlate the digital driving values with CIE X, Y, Z values produced for each color strip.

In the final step (box 88) another mathematical map or look up table is created which is the inverse of the map created in box 87. The inverse map allows CIE X, Y, Z color signals to be mapped to a region of CMYK driving values containing the resulting color. Interpolation is used to infer the driving value best representing the color.

Further embodiments of the invention are directed to producing a standardized image of an object that has first been recorded on film. Three basic steps are involved. First, a spectral plate is used to record spectral data for the light source illuminating the object on the film on which the object is recorded. Next, the spectral data recorded on the film is interpreted by the color calibration apparatus previously described. Thus in this embodiment, the color calibration apparatus is functioning as a color calibrated film scanner. In the third step, the spectral data from the film is used either to generate color correction data for controlling a color photographic printer or to generate a standardized digital record of the scene or object recorded on the film. The color correction data is thus used to restore the colors recorded on film to the colors of the object that was photographed. The standardized digital record of the scene may be displayed visually on a video display unit. The standardized digital record may also be used to generate a fixed graphic image using a color graphics printer. The color graphics printer may also be calibrated in accordance with the method described in FIG. 9. The basic steps are described in detail below.

Figures 10A, 10B:
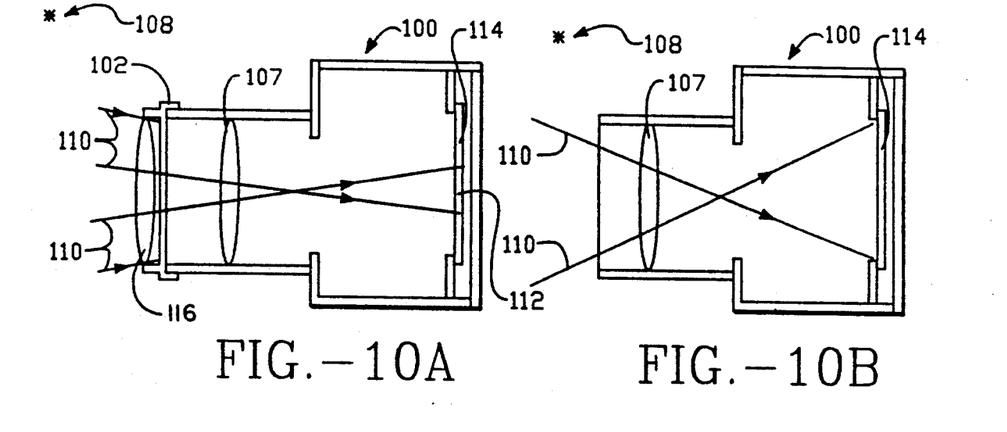
FIG. 10(a), schematically illustrates a photographic camera with an externally mounted spectral plate.
FIG. 10(b) shows the camera of FIG. 10(a) without the spectral plate.
Figure 10C:
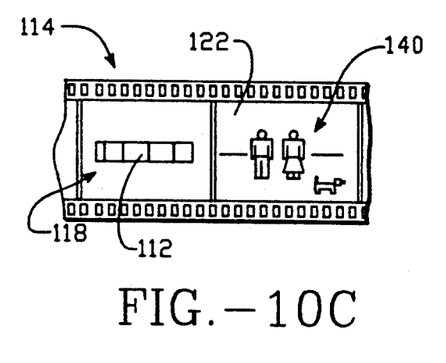
FIG. 10(c) schematically illustrates the format of film exposed in the camera of FIGS. 10(a) and 10(b).
Figure 11:
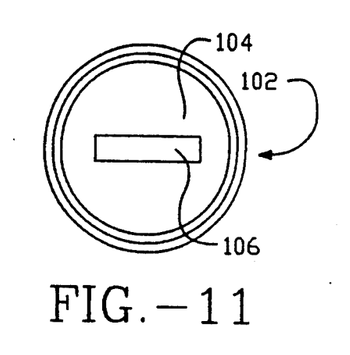
FIG. 11 schematically illustrates a lens cap including a spectral plate.

A method of recording spectral data of photographic lighting conditions on film is illustrated by FIGS. 10(a), 10(b) and 10(c), and by FIG. 11.

Referring first to FIG. 10(a), a camera 100 is fitted with a lens cap 102. The lens cap 102 includes an opaque portion 104 and a spectral plate 106 (see FIG. 11). A light source 108 illuminates the object or scene (not shown). An image of the spectrum of light source 108 is recorded by transmitting light 110 (reflected from the scene illuminated by light source 108) through spectral plate 106 and camera lens 107 to form an image of a spectrum of light source 108 on a film 112. An auxiliary lens 116 may be added to optimally focus image 112 on film 114. The opaque portion 104 of lens cap 102 prevents any other light from the scene from reaching film. The image 112 of the light source spectrum is recorded on a frame 118 of film 114 (see FIG. 10(c)). Next an image of the object is recorded. Specifically, lens cap 102 is removed from camera 100 as illustrated in FIG. 10(b). Light 110, reflected by the object or scene from light source 108, may now be transmitted through camera lens 107 to film 114 without obstruction. Film 114 may be exposed to form an image 120 of the object on another frame 122 of film 114 (see FIG. 10(c)).

Spectral data may be recorded immediately before (or after) each new photographic exposure is made, or only when lighting conditions change substantially. The requirement for reoordinq new spectral data is thus left to the judgement of the photographer.

Figure 12A:
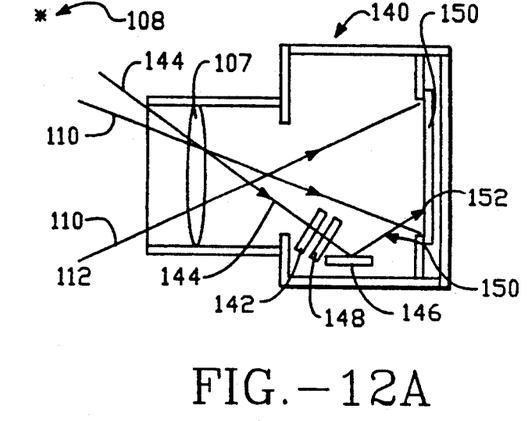
FIG. 12(a) schematically illustrates a photographic camera including an internally mounted spectral plate.
Figure 12B:
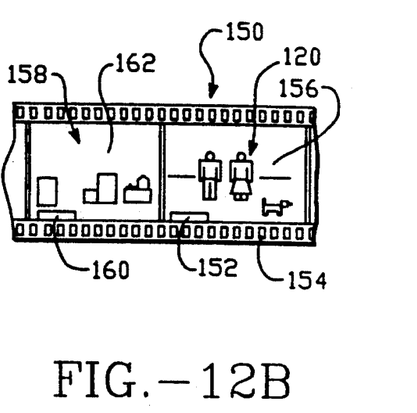
FIG. 12(b) shows the format of film exposed in the camera of FIG. 12(a).

Another method for recording spectral data of photographic lighting conditions on film is illustrated in FIG. 12(a). Here a camera 140 has a spectral plate 142 incorporated therein. The spectral plate 142 is illuminated by light 144 (reflected from light source 108 by the object or scene) which would not normally reach the film 150. A reflector 146 for redirecting light 144 and a lens 148 form an image 152 of spectral plate 142 near an edge 154 of film 150 (see FIG. 12(b)). Thus when an exposure is made, the image 120 of the object and the image 152 of the spectral plate (representing the lighting conditions for the exposure) are recorded together on the same frame 156 of film 150. Referring again to FIG. 12(b), a second exposure to record the image 158 of a different object would be recorded together with a new image 160 (representing the lighting conditions of the second exposure) of spectral plate 142 on frame 162 of film 150.

Figure 13A:
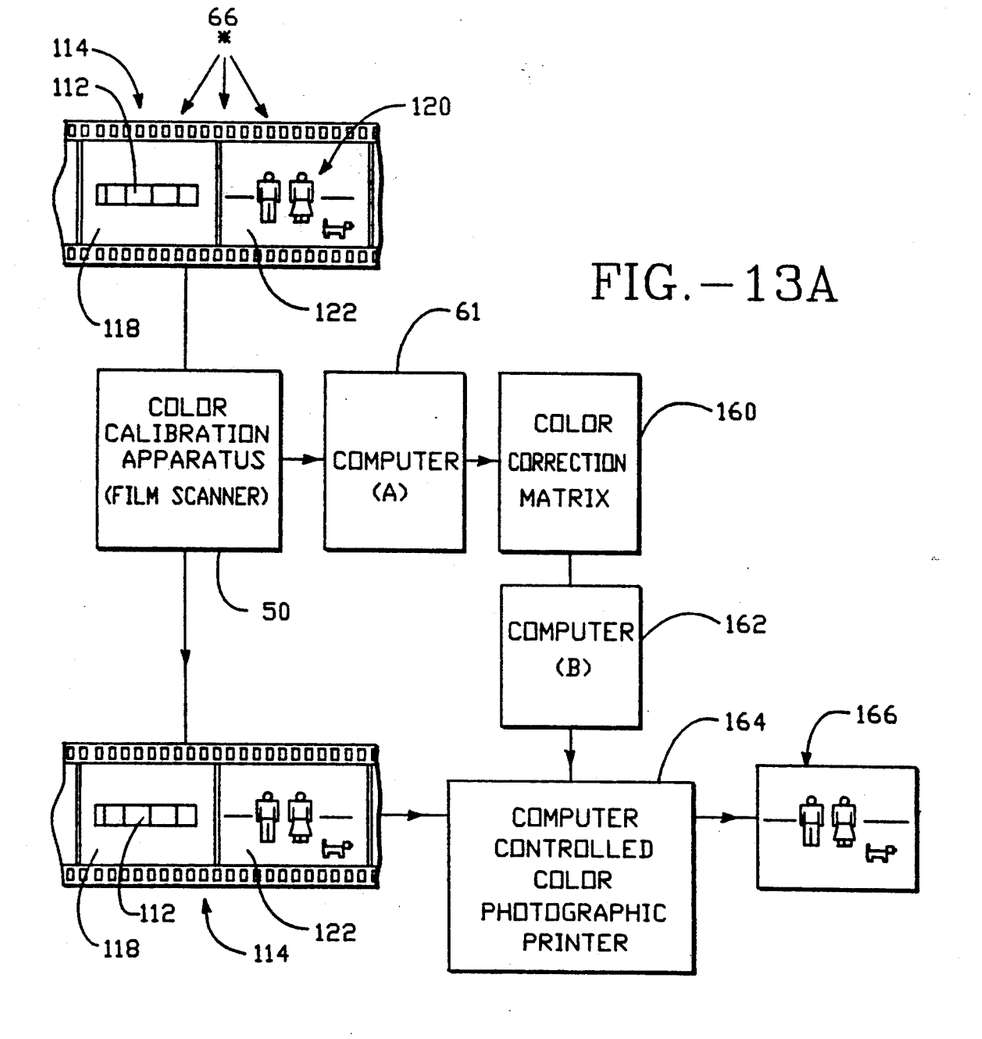
FIG. 13(a) shows a block diagram of a system for producing a standardized photographic image from film exposed in the cameras of FIGS. 10(a) and 10(b).
Figure 13B:
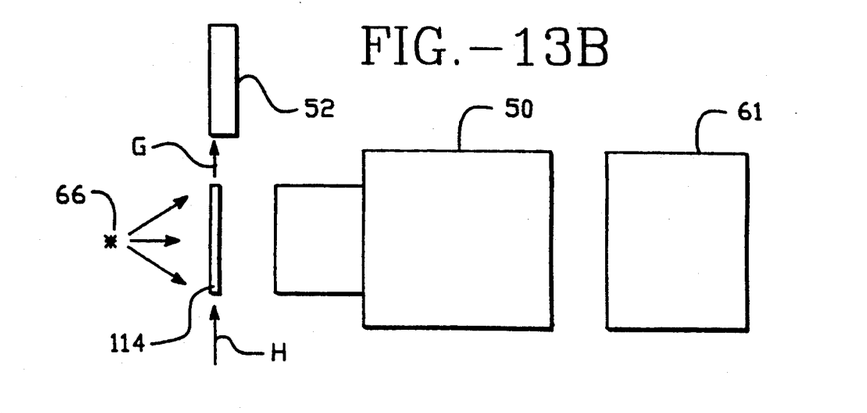
FIG. 13(b) schematically illustrates a film scanner with a spectral plate and film to be scanned.

FIGS. 13(a) and 13(b) illustrate a system for producing a standardized or color corrected photographic print. As shown, color calibration apparatus 50 is first calibrated for the light source 66 using calibration unit 52 as previously described. Calibration unit 52 is then removed (arrow G) and replaced by film 114 (arrow H). Film 114 is illuminated by light source 66 and scanned by color calibration apparatus 50.

The image 112 of the spectrum on frame 118 of film 114 is electronically scanned and recorded by color calibration apparatus 50. The image 112 of the spectrum on the film includes all of the color aberrations introduced in the processing of the film and thus the color aberrations present in the image of object. The recorded image of the spectrum on the film is then compared with a color standard spectrum (the spectrum of a standard illuminant) digitally stored in computer 61. A color correction matrix or function 160, for correcting colors recorded from the film scan, is generated by computer 61 from the comparison of the film spectrum 112 and the standard spectrum. The matrix calculation is carried out in the same way as the transformation matrix calculation described in above-discussed Equations (1), (2), (3), and (4).

The color correction matrix 160 is read by computer 162 controlling a color photographic printer. Color correction data is generated by computer 162 and used to set exposure parameters in color photographic printer 164. The film 114 is removed from color calibration apparatus 50 and fed into color photographic printer 164 where frame 122 of film 114 is processed using the exposure parameters generated by computer 162 to produce a photographic print 166. While color correction matrix 160 is depicted as a separate entity in the FIG. 13(a) it is not necessary in practice that the correction matrix ever be produced in tangible form. For example, the matrix may be stored electronically in computer 61 as a digital record and transferred electronically directly to computer 162. Furthermore, computers 61 and 162 may be replaced by a single computer which performs all of the data processing and control functions described. Alternatively, computers 61 may be incorporated physically in the color calibration apparatus and computer 162 may be incorporated in the color photographic printer.

Figure 14:
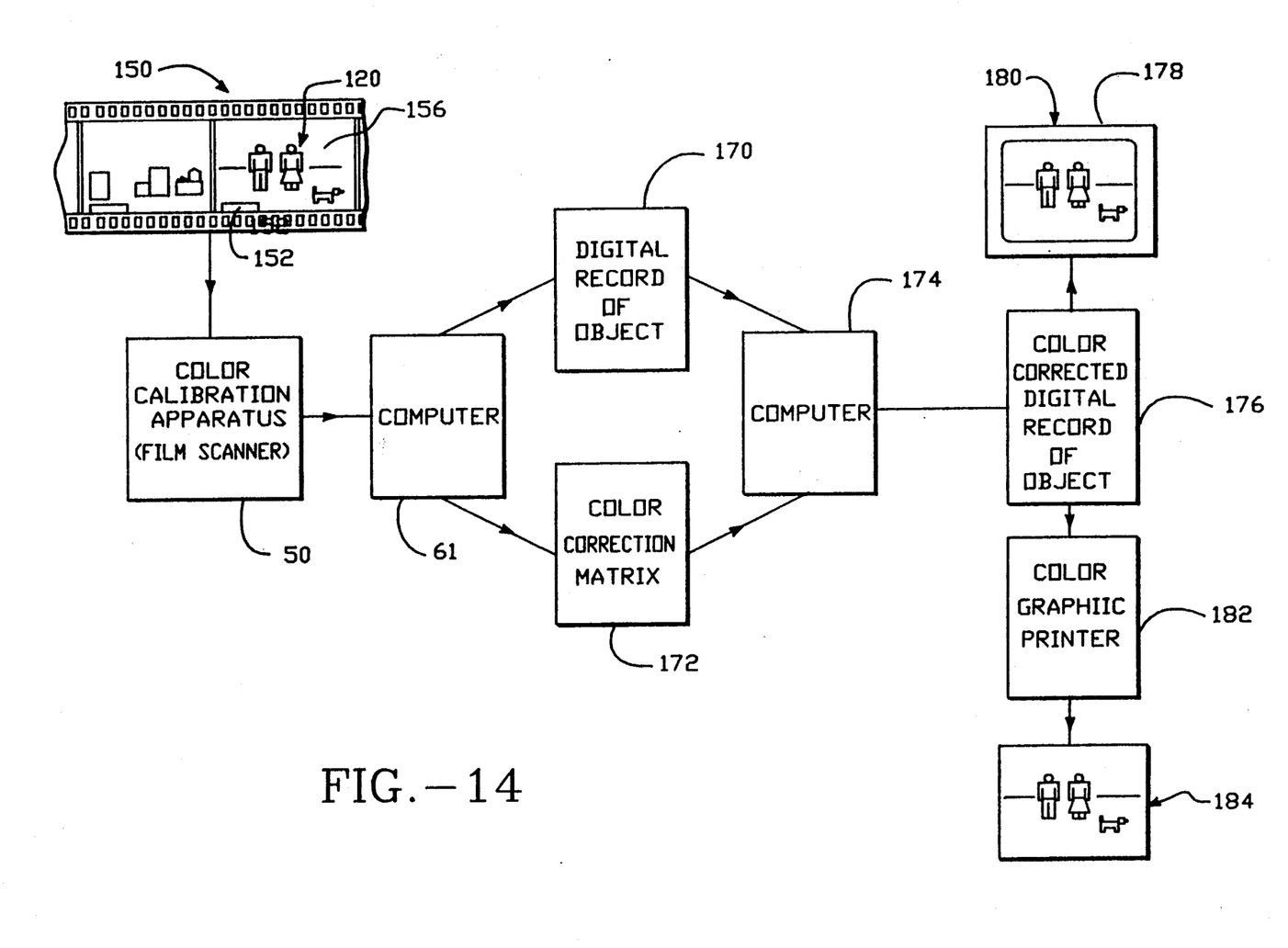
FIG. 14 is a block diagram illustrating a system for producing a standardized electronic image from film exposed in the camera of FIG. 12(a).

Another embodiment of the invention is illustrated in FIG. 14. Here a system for producing a standard digital record of an object or scene from an intermediate photographic record on film is described. Referring now to FIG. 14, color calibration apparatus 50 is calibrated as previously described. Film 150 is then placed in front of the color calibration apparatus as illustrated in FIG. 13(b). Frame 156 is scanned and computer 61 electronically records an image 170 of object 120 and a separately records spectral image 152. Computer 61 generates a color correction matrix 172 using the recorded data from spectral image 152. The record of the object and the record of color correction matrix are processed by computer to generate a color corrected (or standardized) digital record 176 of object 120. Digital record 176 may then be used to produce a video image 178 of object 120 on video display unit 180. Digital record 176 may also be interpreted by a color graphics printer to produce a fixed graphic image 184 (hard copy) of object 120.

Color correction matrix 172 and digital record 170 are depicted in FIG. 14 as separate entities for clarity. However, it is not necessary in practice that the correction matrix and the record be produced in tangible form. For example, they may be stored electronically in computer 61 as a digital record and transferred electronically directly to computer 174. Computers 61 and 174 may also be replaced by a single computer that performs all of the data processing and control functions described. It is also not necessary that color corrected digital record 176 be produced in tangible form. Color corrected digital record 176 may be transferred electronically directly to video display unit 180 or to color graphics printer 182.

The above described system may also be used With film 114. The method would differ only in that the film must be indexed in front of the scanner, i.e., from frame 118 to frame 122 to perform the spectral data and object scans.

The present invention has been described in terms of a number of different embodiments. The invention however is not limited to the embodiments depicted and described. Rather the scope of the invention is defined by the appended claims.

What is claimed is:

1. A system for producing a standardized color image of an object, comprising:
   photographic recording means for recording a first image of the object on a film, said photographic recording means including calibration means for recording on said film an image of a spectrum of a first light source illuminating the object;
   scanning means for scanning said film and generating a record of said image of said first light source spectrum, said scanning means including means for providing electrical signals representing a colored image of said film, means for resolving an output of a second light-source illuminating said film into a spectrum for calibrating said electrical signals, and means for providing a gray-scale representation of said second light-source for calibrating said electrical signals;
   means for computing color correction data by comparing said record of said image of said first light source spectrum to a spectrum of a standard illuminant;
   photographic reproduction means for producing a second image of said object from said first image of said object; and
   means for controlling said reproduction means by use of said color correction data.

2. The system of claim 1 wherein said calibration means includes a spectral plate incorporated in said photographic recording means.

3. The system of claim 2 wherein said image of said object and said image of said first light source spectrum are recorded together on a frame of said film.

4. The system of claim 1 wherein said calibration means includes a spectral plate removably mounted in front of said photographic recording means.

5. The system of claim 4 wherein said spectral plate is mounted in a lens cap.

6. The system of claim 5 wherein said spectral plate is a linear variable bandpass filter.

7. The system of claim 4 wherein said image of said first light source spectrum and said image of said object are recorded separately on different frames of the film.

8. The system of claim 1 wherein said photographic reproduction means and said controlling means are incorporated in a computer controlled photographic printer.

9. The system of claim 1 wherein said scanning means includes:
   means for comparing said second light source spectrum to a color standard and generating color calibration data based on said standard; and
   means for calibrating images recorded by said scanning means such that said images conform to said color standard.

10. A system for producing a standardized color image of an object, comprising:
    photographic recording means for recording an image of the object on a film, said photographic recording means including calibration means for recording on said film an image of a spectrum of a first light source illuminating the object;
    scanning means for scanning said film and generating a first record of said object and a record of said image of said first light source spectrum, said scanning means including means for providing electrical signals representing a colored image of said film, means for resolving an output of a second light-source illuminating said film into a spectrum for calibrating said electrical signals, and means for providing a gray-scale representation of said second light-source for calibrating said electrical signals;
    means for computing color correction data by comparing said image of said first light source spectrum to a spectrum of a standard illuminant; and
    means for generating a second record of said object by modifying said first record of said object by said color correction data.

11. The system of claim 10 further including means for displaying said second record of said object on a video display unit.

12. The system of claim 10 further including means for converting said second record of said object to a fixed graphic image of said object.

13. The system of claim 12 wherein said converting means is a color graphics printer.

14. The system of claim 13 wherein said color graphics printer includes a printer calibration system for correlating printer driving values with standardized color signals from color test strips, said printer calibration system including means for illuminating said color test strips, means for recording spectra of said color test strips, and means for recording a spectrum of said illuminating means.

15. The system of claim 10 wherein said calibration means includes a spectral plate.

16. The system of claim 15 wherein said calibration means is incorporated in said photographic recording means.

17. The system of claim 16 wherein said image of said object and said image of said first light source spectrum are recorded together on at least one frame of said film.

18. The system of claim 15 wherein said calibration means is removably mounted in front of said photographic recording means.

19. The system of claim 18 wherein said image of said first light source spectrum and said image of said object are recorded separately on different frames of said film.

20. A system for producing a standardized color image of an object, comprising:
    photographic recording means for recording a first image of the object on a film, said photographic recording means including calibration means for recording on said film an image of a spectrum of a first light source illuminating the object;
    scanning means for scanning said film and generating a record of said image of said first light source spectrum, said scanning means including means for providing electrical signals representing a colored image of said film, means for resolving an output of a second light-source illuminating said film into a spectrum for calibrating said electrical signals, means for providing a gray-scale representation of said second light-source for calibrating said electrical signals, and means for converting said record from r, g, b values into CIE x, y, z values;
    means for computing color correction data by comparing said record of said first light source spectrum to a spectrum of a standard illuminant;
    reproduction means for producing a second image of said object from said first image of said object; and
    means for controlling said reproduction means by use of said color correction data.

21. A system for producing a standardized color image of an object, comprising:
photographic recording means for recording an image of the object on a film, said photographic recording means including calibration means for recording on said film an image of a spectrum of a first light source illuminating the object;
scanning means for scanning said film and generating a first record of said object and a record of said image of said first light source spectrum, said scanning means including means for providing electrical signals representing a colored image of said film, means for resolving an output of a second light-source illuminating said film into a spectrum for calibrating said electrical signals, means for providing a gray-scale representation of said second light-source for calibrating said electrical signals, and means for converting said record from r, g, b values into CIE x, y, z values;
means for computing color correction data by comparing said image of said first light source spectrum to a spectrum of a standard illuminant; and
means for generating a second record of said object by modifying said first record of said object by said color correction data.

22. A system for producing a standardized color image of an object from a photographic image, recorded on a film, and an image of a spectrum of a first light source illuminating the object, comprising:
scanning means for scanning the film and generating a record of said image of said first light source spectrum, said scanning means including means for providing electrical signals representing a colored image of said film, means for resolving an output of a second light-source illuminating said film into a spectrum for calibrating said electrical signals, and means for providing a gray-scale representation of said second light-source for calibrating said electrical signals;
means for computing color correction data by comparing said record of said image of said first light source spectrum to a spectrum of a standard illuminant;
photographic reproduction means for producing a second image of said object from said first image of said object; and
means for controlling said photographic reproduction means by use of said color correction data.

23. A system for producing a standardized color image of an object from a photographic image of the object and an image of a spectrum of a first light source illuminating the object recorded on a film, comprising:
scanning means for scanning the film and generating a first record of said object and a record of said image of said first light source spectrum, said scanning means including means for providing electrical signals representing a colored image of said film, means for resolving an output of a second light-source illuminating said film into a spectrum for calibrating said electrical signals, and means for providing a gray-scale representation of said second light-source for calibrating said electrical signals;
means for computing color correction data by comparing said image of said first light source spectrum to a spectrum of a standard illuminant; and
means for generating a second record of said object by modifying said first record of said object by said color correction data.

24. A method for producing a standardized color image of an object, comprising:
photographically recording a first image of the object on a film;
photographically recording on said film an image of a spectrum of a first light source illuminating the object;
illuminating the film with a second light source;
resolving light from said second light source into a spectrum;
providing a grey scale representation of said second light source;
calibrating a scanner using said spectrum of said second light source and said grey scale representation of said second light source;
scanning said film with said scanner to record said image of said first light source spectrum;
computing a color correction function by comparing said image of said first light source spectrum against a spectrum of a standard illuminant;
determining exposure parameters for controlling a color photographic printer using said color correction function; and
photographically reproducing a second image of said object from said first image of said object using said color photographic printer.

25. The method of claim 24 wherein said first image of the object and said image of said first light source are recorded on different frames of said film.

26. The method of claim 24 wherein said first image of the object and said image of said first light source are recorded together on a single frame of said film.

27. The method of claim 24 wherein the film scanner is calibrated such that images recorded therewith conform to a color standard.

28. The method of claim 27 wherein said film scanner is calibrated according to a method including:
comparing said second light source spectrum to a color standard; and
generating a transformation function for converting r, g, b values of images recorded by said film scanner into values of said color standard.

29. A method for producing a standardized color image of an object, comprising:
photographically recording an image of the object on a film;
photographically recording on said film an image of a spectrum of a first light source illuminating the object;
illuminating said film with a second light source;
resolving light from said second light source into a spectrum;
providing a grey scale representation of said second light source;
calibrating a scanner using said spectrum of said second light source and said grey scale representation of said second light source;
scanning said film with said scanner to record said image of said first light source spectrum;
scanning said film with said scanner to generate a first record of said object;
computing a color correction function by comparing said image of said first light source spectrum against a spectrum of a standard illuminant; and generating a second record of said object using said first record modified by said color correction function.

30. The method of claim 29 further including creating a video display of said object using said second record.

31. The method of claim 29 further including producing a fixed graphic image the object using said second record of said object and a color graphics printer.

32. The method of claim 29 wherein said film scanner is calibrated by a method including:
comparing said second light source spectrum to a color standard; and
generating a transformation function for converting r, g, b values of images recorded by said film scanner into values of said color standard.

33. A system for producing a standardized color image of an object, comprising:
photographic recording means for recording an image of the object on a film, said photographic recording means including calibration means for recording on said film an image of a spectrum of a first light source illuminating the object;
scanning means for scanning said film and generating a first record of said object and a record of said image of said first light source spectrum;
means for computing color correction data by comparing said image of said first light source spectrum to a spectrum of a standard illuminate;
means for generating a second record of said object by modifying said first record of said object by said color correction data; and
a color graphics printer for converting said second record of said object to a fixed graphic image of said object, said color graphics printer including a printer calibration system for correlating printer driving values with standardized color signals from color test strips, said printer calibration system including means for illuminating said color test strips, means for recording spectra of said color test strips, and means for recording a spectrum of said illuminating means.

* * * * *